United States Patent [19]

Koga et al.

[11] Patent Number: 4,924,425

[45] Date of Patent: May 8, 1990

[54] METHOD FOR IMMEDIATELY WRITING AN OPERAND TO A SELECTED WORD LOCATION WITHIN A BLOCK OF A BUFFER MEMORY

[75] Inventors: Satoru Koga, Kawasaki; Tsutomu Tanaka, Yokohama, both of Japan

[73] Assignee: Fujitsu Limited, Kawasaki, Japan

[21] Appl. No.: 73,281

[22] Filed: Jul. 8, 1987

Related U.S. Application Data

[62] Division of Ser. No. 674,321, Nov. 23, 1984, abandoned.

[30] Foreign Application Priority Data

Nov. 30, 1983 [JP] Japan .................. 58-226335
Dec. 7, 1983 [JP] Japan .................. 58-231105

[51] Int. Cl.$^5$ .......................... G06I 12/08; G06I 7/00
[52] U.S. Cl. ........................ 364/900; 364/964.2; 364/964.34; 364/947.2; 364/948.3
[58] Field of Search ... 364/200 MS File, 900 MS File

[56] References Cited

U.S. PATENT DOCUMENTS

| | | | |
|---|---|---|---|
| 3,705,388 | 12/1972 | Nishimoto | 364/200 |
| 4,317,168 | 2/1982 | Messina et al. | 364/200 |
| 4,399,506 | 8/1983 | Evans et al. | 364/200 |
| 4,410,946 | 10/1983 | Spencer | 364/200 |
| 4,550,437 | 10/1985 | Kobayashi et al. | 364/200 X |
| 4,586,133 | 4/1986 | Steckler | 364/200 |
| 4,616,341 | 10/1986 | Andersen et al. | 364/200 X |
| 4,631,668 | 12/1986 | Kubo et al. | 364/200 |

FOREIGN PATENT DOCUMENTS 0054888 6/1982 European Pat. Off. .
2016752 9/1979 United Kingdom .

OTHER PUBLICATIONS

Dutton et al., "Attached Processor Data Copies", IBM IDB, vol. 24, No. 3, Aug., 1981, pp. 1725-1726.
Blazejewski et al., "Instruction Buffer with Simultaneous Store and Fetch Operations", IBM IDB, vol. 23, No. 2, Jul., 1980, pp. 670-672.
IBM Technical Disclosure Bulletin, vol. 25, No. 11B, Apr. 1983, "Design for Improved Cache Performance Via Overlapping of Cache Miss Sequences", by Driscoll et al., pp. 5962-5966.

*Primary Examiner*—Thomas C. Lee
*Attorney, Agent, or Firm*—Staas & Halsey

[57] ABSTRACT

A method for controlling a buffer memory for storing a copy of a portion of a main memory, including a step of detecting whether the address in question exists in the buffer memory in response to an instruction to carry out reading from and subsequent writing into the same address. In the case where the results of the detection are affirmative, reading of the data from the address in question and the subsequent writing of the result of a calculation into the address in question are carried out. In the case where the results of the detection are negative, an instruction for the main memory to read data in the block which contains the address in question is issued. The read data in the block is transferred from the main memory to the buffer memory, the transferred data is written into the buffer memory with the word of the requested address placed as the beginning word of the data, and the beginning word of the data from the buffer memory is picked-up. The picked-up beginning word is transmitted to a calculation portion, and the results of the calculation are written into the same address of the buffer memory in succession to the writing of the beginning word of the data.

3 Claims, 11 Drawing Sheets

INSTRUCTION "IMMEDIATE"

BIT POSITION → 0 1 2 3 4 5 6 7 8 9 10 11 12 13 14 15 16 17 18 19 20 21 22 23 24 25 26 27 28 29 30 31

| ANDI | I (2) | B(1) | D (1) |

CODE (IMMEDIATE)  DATA (IMMEDIATE)  ADDRESS

Fig. 3B

BIT POSITION → 0 1 2 3 4 5 6 7 8 9 10 11 12 13 14 15 16 17 18 19 20 21 22 23 24 25 26 27 28 29 30 31

| ORI | I (2) | B(1) | D(1) |

CODE (IMMEDIATE)  DATA (IMMEDIATE)  ADDRESS

Fig. 3C

BIT POSITION → 0 1 2 3 4 5 6 7 8 9 10 11 12 13 14 15 16 17 18 19 20 21 22 23 24 25 26 27 28 29 30 31

| EORI | I (2) | B(1) | D(1) |

CODE (IMMEDIATE)  DATA (IMMEDIATE)  ADDRESS

MOVE-IN : MOVE-IN INSTRUCTION
MIR : MOVE-IN REGISTER

METHOD FOR IMMEDIATELY WRITING AN OPERAND TO A SELECTED WORD LOCATION WITHIN A BLOCK OF A BUFFER MEMORY

CROSS-REFERENCE TO RELATED APPLICATION

This application is a divisional of Application Ser. No. 674,321, filed Nov. 23, 1984 now abandoned.

BACKGROUND OF THE INVENTION

1. Field of the Invention

The present invention relates to a method for controlling a buffer memory in a data processing apparatus. The method according to the present invention is applicable to a data processing apparatus including a main memory and a central processing unit having a buffer memory for storing a copy of a portion of the information stored in the main memory, wherein speed-up of the access process to the buffer memory is needed.

2. Description of the Related Art

In general, in a data processing device having a buffer memory of the set associative type, in which a copy of a portion of a main memory is stored, there is a problem that if the address to which the writing of an operand data is instructed, is included in a block in the buffer memory to which the writing of the data of the main memory is being carried out, the writing of the operand data into the address of the block is possible only after the writing of the data of the main memory into the block, is completed.

There is further a problem that, even in the case where the writing of the operand data into the address to which the writing of the data of the main memory has been completed is instructed, the writing of the operand data into such address cannot be carried out until the writing of the data of the main memory into the entire block is completed.

SUMMARY OF THE INVENTION

It is the object of the invention to provide an improved method for controlling a buffer memory in a data processing apparatus in which the writing of operand data into a block of the buffer memory is speeded up to realize high speed operation of a central processing unit of a data processing apparatus having the buffer memory.

According to a fundamental aspect of the present invention, there is provided a method for controlling a buffer memory in a data processing apparatus with a central processing unit including a buffer memory for storing a copy of a portion of a main memory. The method includes the step of detecting whether the address in question exists in the buffer memory in response to an instruction to carry out reading from the subsequent writing to the same address. In the case where the result of the detection is affirmative, reading of the data from the address in question and subsequent writing of the results of a calculation into the address in question, are carried out. In the case where the result of the detection is negative, an instruction for the main memory to read data in the block which contains the address in question is issued, the read data in the block is transferred from the main memory to the buffer memory, the transferred data is written into the buffer memory with the word of the requested address placed as the beginning word of the data, the beginning word of the data is also bypassed from the buffer memory and transmitted to a calculation portion, and the results of the calculation are written into the same address of the buffer memory in succession to the writing of the beginning word of the data. Thus, successive execution of reading of data from and writing of data into the same address of the buffer memory is made possible in addition to usual reading of data from and writing of data into the buffer memory.

BRIEF DESCRIPTION OF THE DRAWINGS

In the drawings,

FIG. 4, including

FIG. 9, including FIGS. 9A and 9B, is a block diagram of the structure of the address decision portion in the apparatus shown in FIG. 4.

DESCRIPTION OF THE PREFERRED EMBODIMENTS

For reference to the embodiments of the present invention, the fundamental arrangement of a data processing apparatus to which the method according to the present invention is applied will be described with reference to FIGS. 1 and 2. An example of the format of an instruction is shown in FIGS. 3A, 3B, and 3C.

Figure 1:
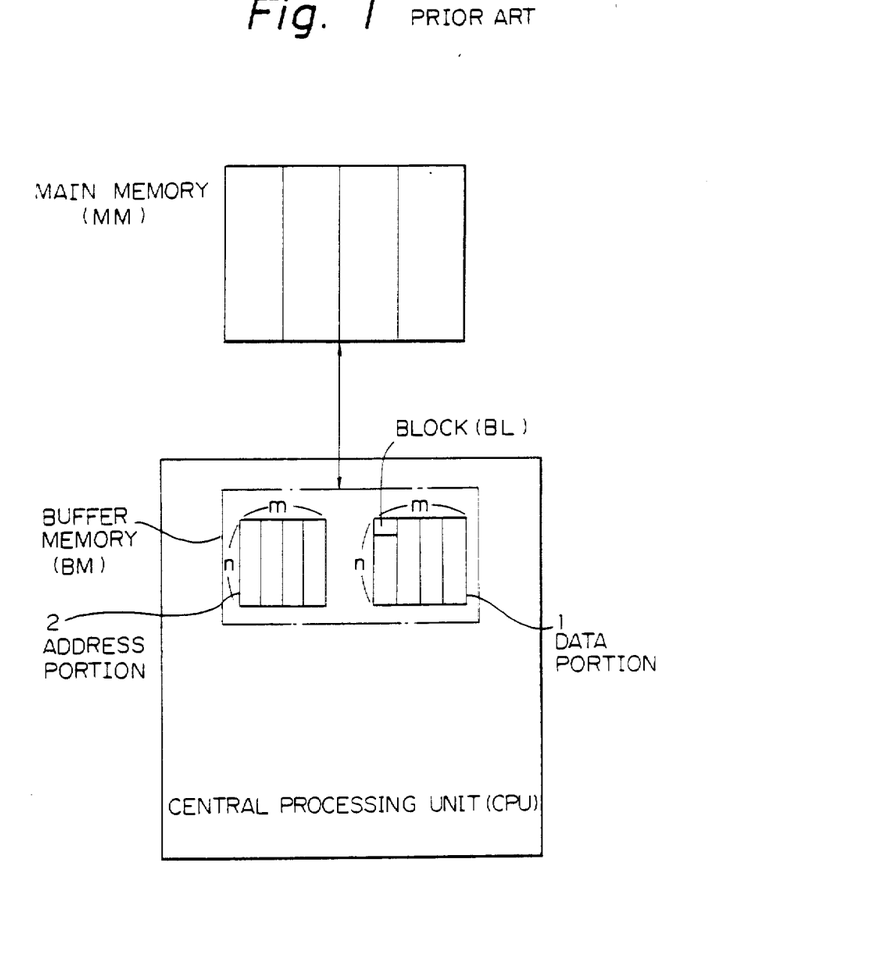
FIGS. 1 and 2 are schematic diagrams of the fundamental arrangement of a data processing apparatus to which the method according to the present invention is applied.

The arrangement shown in FIG. 1 includes a main memory MM and a central processing unit CPU having a buffer memory BM. The buffer memory BM consists of a data portion 1 and an address portion 2. The buffer memory BM is of the set associative type. The data portion 1 consists of m parts. Each of the m parts consists of n blocks. The structure of the data portion 1 corresponds to the structure of the address portion 2.

Figure 2:
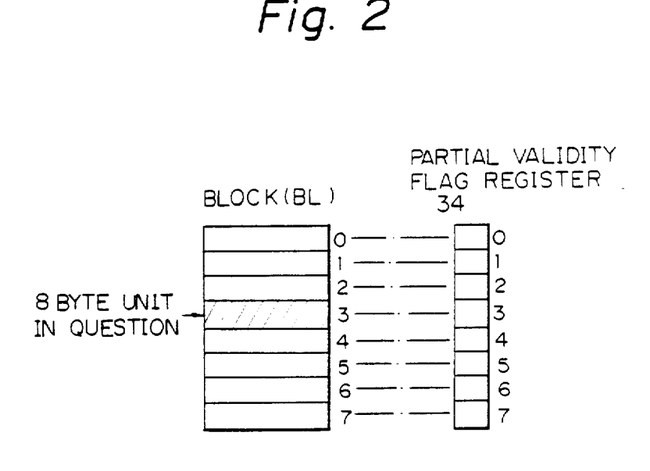
Figure 3A:
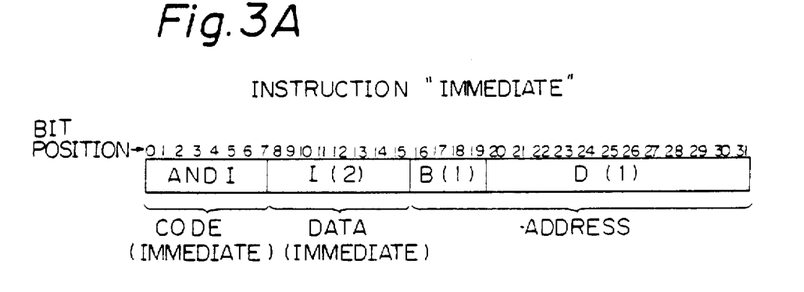
FIGS. 3A, 3B, and 3C illustrate examples of the format of the instruction "IMMEDIATE"
Figure 3B:
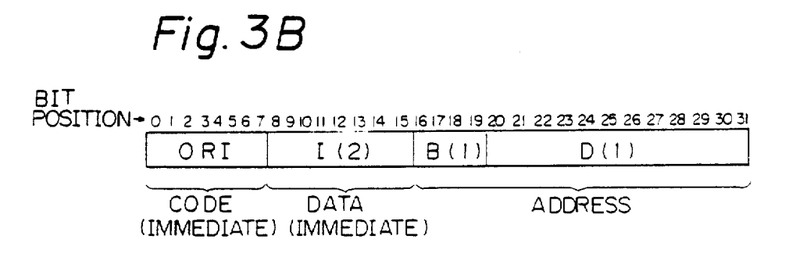
Figure 3C:
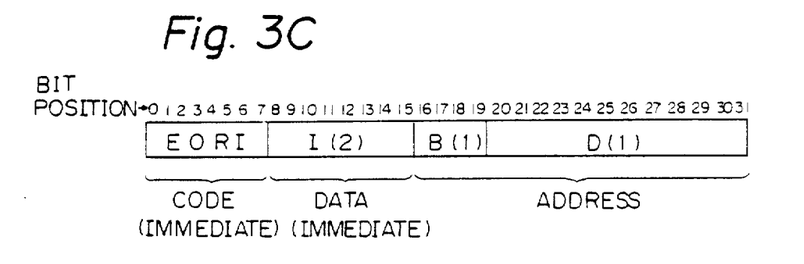

An example of the structure of one block BL in the data portion is illustrated in FIG. 2. The block BL consists of 64 bytes formed by 8 sequences of 8-byte units. An 8-byte unit corresponds to 2 words. The unit of writing data into the data portion 1 is 8-byte.

In the address portion 2, validity bits and addresses corresponding to the addresses in the main memory MM are stored.

With reference to FIGS. 1 and 2, it will be understood that there is a problem, as described hereinbefore, that, if the address to which the writing of the operand data is instructed is included in the block in the buffer memory BM to which the writing of the data of the main memory MM is being carried out, the writing of operand data into the address of the block BL in the buffer memory is possible only after the writing of the data of the main memory MM into the block BL is completed.

Also, it will be understood that there is further a problem, as described hereinbefore, that, even in the case where the writing of the operand data into the address to which the writing of the data of the main memory MM has been completed is instructed, the writing of the operand data into such address cannot be carried out until the writing of the data of the main memory MM into the entire block BL is completed.

Examples of the format of the instruction "IMMEDIATE" will be described with reference to FIGS. 3A, 3B, and 3C.

An AND IMMEDIATE instruction is shown in FIG. 3A. The numerals 0 to 31 indicate bit positions. The AND IMMEDIATE instruction consists of ANDI as the operation code, I(2) as the data, and B(1) and D(1) as the address. B(1) is the number designating the base register B(1). D(1) is the displacement with regard to the base number. The logic product of the content of 1 byte in the address defined by the content of the base register B(1) and the value of D(1), and the content of I(2), is stored in the same operand address.

An OR IMMEDIATE instruction is shown in FIG. 3B. The OR IMMEDIATE instruction consists of ORI as the operation code, I(2) as the data, and B(1) and D(1) as the address. B(1) is the number designating the base register B(1). D(1) is the displacement with regard to the base number. The logical sum of the content of 1 byte in the address defined by the content of the base registered B(1) and the value of D(1), and the content I(2), is stored in the operand address.

An EOR IMMEDIATE instruction is shown in FIG. 3C. The EOR IMMEDIATE instruction consists of EORI as the operation code, I(2) as the data, and B(1) and D(1) as the address. B(1) is the number designating the base register B(1). D(1) is the displacement with regard to the base number. The exclusive logical sum of the content of 1 byte in the address defined by the content of the base register B(1) and the value of D(1), and the content I(2), is stored in the same operand address.

In general, in the case of an instruction for carrying out a fetch-and-store operation to the same address using a format such as shown in FIGS. 3A, 3B, and 3C in the data processing apparatus shown in FIGS. 1 and 2, first, the central processing unit CPU is operated to check if the block including this operand address exists in the buffer memory. When it exists, the operand is fetched, the logic operation instructed by the instruction is carried out and the result of the calculation is stored in the buffer memory. In a store-through type buffer memory, the result is stored in both the buffer memory and the main memory.

If the block including this operand address does not exist in the buffer memory, reading-out of the block including this operand address is requested to the main memory, and the read-out block is registered in the buffer memory. If one word is registered by one registration operation in the buffer memory, n registration operations to the buffer memory are required for registering n words in the buffer memory. For example, eight registration operations are required for registering 64 bytes of data into one block of the buffer memory with an 8-byte data registration per each registration operation.

It is common knowledge that control is carried out in such manner that the sequence of registration operation from the main memory to the buffer memory is started from the word including the required operand address.

According to the present invention, if the block including the operand address in question does not exist in the buffer memory, the registration of the block from the main memory to the buffer memory is started, the logic operation is carried out for the operand data with regard to the beginning word, and, after this logic operation, the operand data is stored in the buffer memory.

Figure 4A:
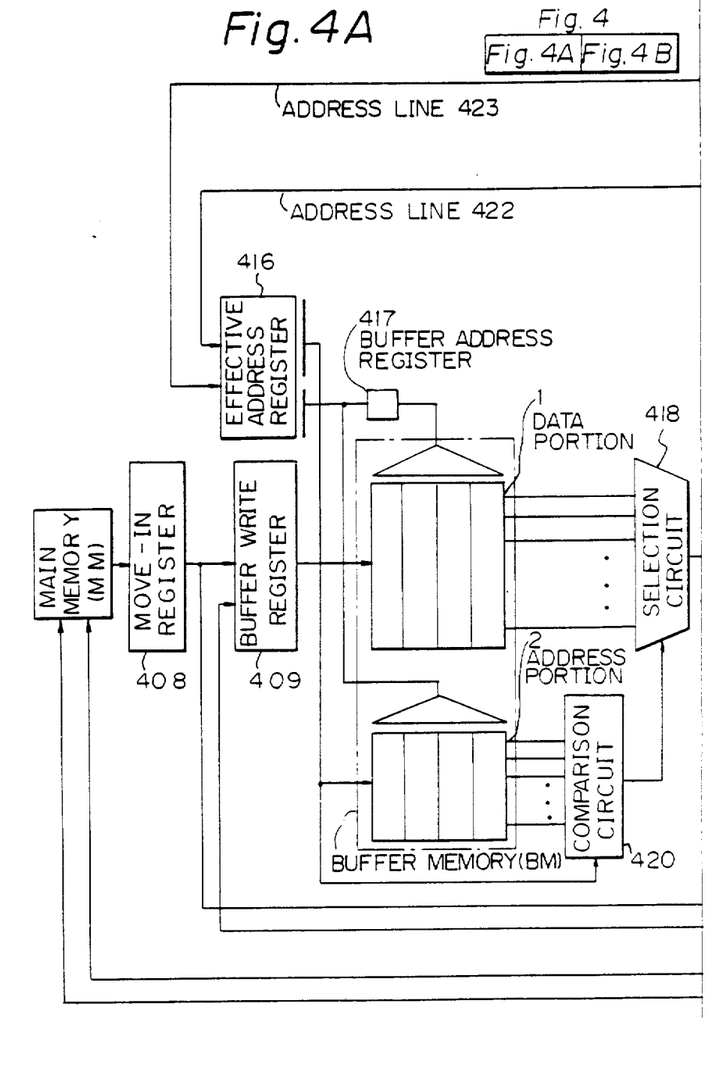
FIGS. 4A and 4B, is a block diagram of the structure of a data processing apparatus to which the method according to the present invention is applied.
Figure 4B:
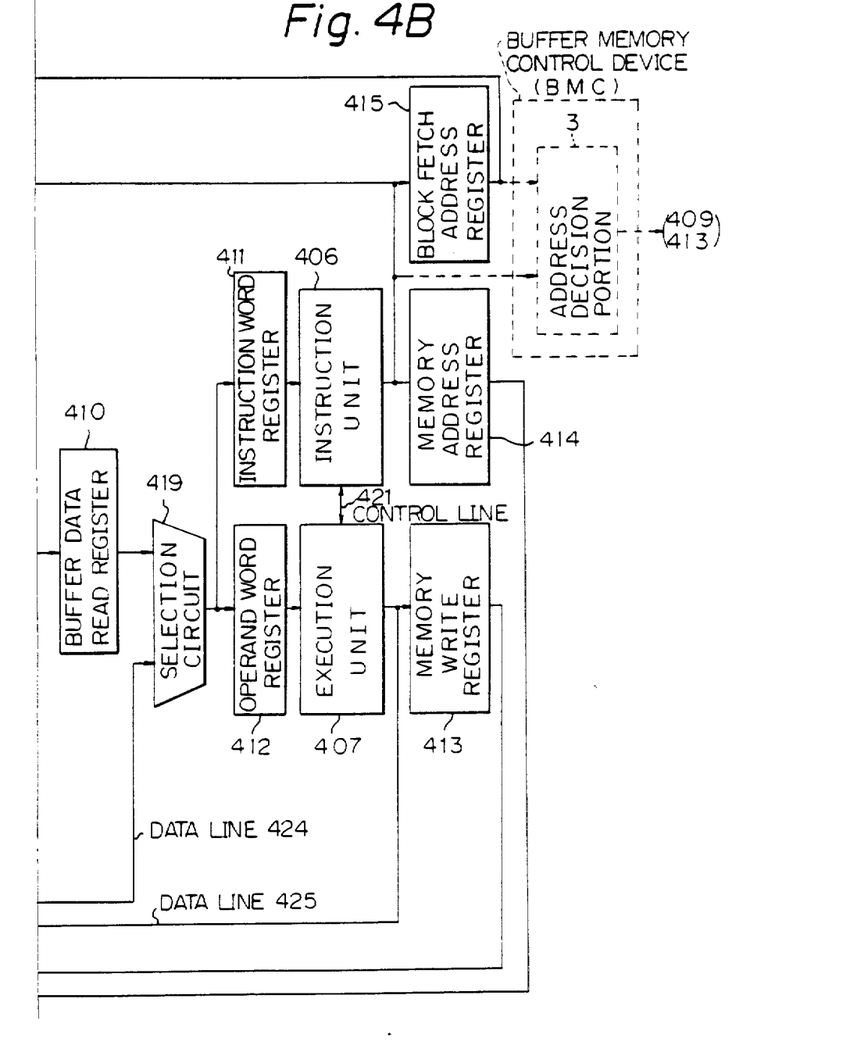

A data processing apparatus to which a method for controlling a buffer memory according to an embodiment of the present invention is applied, is shown in FIG. 4. The apparatus shown in FIG. 4 includes a buffer memory BM consisting of the data portion 1 and the address portion 2, a buffer memory control device BMC, an instruction unit 406, an execution unit 407, a move-in register 408, a buffer write register 409, a buffer data read register 410, an instruction word register 411, an operand word register 412, a memory write register 413, and a memory address register 414. The apparatus shown in FIG. 4 also includes a block fetch address register 415, an effective address register 416, a buffer address register 417, selection circuits 418 and 419, a comparison circuit 420, a control line 421, address lines 422 and 423, and data lines 424 and 425. The apparatus shown in FIG. 4 is of the so-called store-through type buffer memory system in which the storing data is stored simultaneously into the buffer memory and the main memory when the storing address exists in the buffer memory.

The operation of the central processing unit CPU will now be described.

Fetch the Instruction: The instruction unit 406 sends the address of an instruction to be executed to the effective address register 416 through the address line 422, and the existence of the address of the instruction to be executed in the address portion 2 of the buffer memory is checked by the comparison circuit 420.

If the existence of the address of the instruction to be executed in the address portion 2 of the buffer memory is detected, one of N blocks read from the data portion 1, is selected by the selection circuit 418, the word of the instruction in the block to be executed is sent to the instruction word register 411 through the buffer data read register 410 and the selection circuit 419, and the sent word of the instruction is executed in the instruction unit 406.

If the existence of the address of the instruction to be executed in the address portion 2 of the buffer memory is not detected, the memory address register 414 sends a request for reading-out the block including the instruction in question to the main memory MM. The block read from the main memory MM is sent in a sequence of eight 8-byte units from the move-in register 408 through the buffer write register 409 to the data portion 1 of the buffer memory BM, and the sent block is stored in the data portion 1. At the same time, the beginning word including the instruction to be executed, is sent to the insruction word register 411 bypassing the buffer memory via the data line 424 and the selection circuit 419, and the sent beginning word is executed in the instruction unit 406.

Fetch the Operand and Execute the Instruction: In order to execute instructions, the instruction unit 406 sends instructions through the control line 421 to the execution unit 407 to carry out the execution. The operand data necessary for the execution unit 407 is read from either the buffer memory or the main memory by the similar process as above explained instruction fetching, and the read operand data is sent through the operand word register 412.

When the block including the address into which the result of the execution by the execution unit 407 is to be written, is registered in the buffer memory, the result of the execution is sent through the data line 425 and the buffer write register 409 to the buffer memory, and the sent result is stored in the buffer memory. At the saame time, the result of the execution is sent through the memory write register 413 to the main memory.

When the block including the address into which the result of the execution by the execution unit 407 is to be written, is not registered in the buffer memory, the result of the execution is only sent through the memory write register 413 to be stored into the main memory.

Execute the Fetch-and-Store Instruction: When a fetch-and-store type instruction such as the IMMEDIATE instruction which instructs the successive executions of the reading from and the writing into the same address, is delivered from the instruction unit 406 and the execution unit 407, first, the registration of the address for the operand in question in the buffer memory is checked.

If the address of the operand is registered in the buffer memory, the operand is sent from the buffer memory through the operand word register 412 to the execution unit 407, and subsequently the storing data from the execution unit 407 is written into the buffer memory and the main memory. That is, the logic operation according to the three instructions shown in FIGS. 3A, 3B, and 3C is effected on the operand data read from the buffer memory by the execution unit 407, and the result of this logic operation is written in the buffer memory and the main memory.

If the operand data of the above-mentioned fetch-and-store instruction does not exist in the buffer memory, the instruction of the reading of the block including the operand is sent to the main memory, the data with the beginning word including the operand data necessary for the execution unit 407, is written in the buffer memory, and, at the same time, the data is sent through the data line 424 and the selection circuit 419 to the execution unit 407.

The logic operation according to the three instructions shown in FIGS. 3A, 3B, and 3C is effected on the operand data by the execution unit 407, and the result of the logic operation is transmitted through the data line 425. In succession to the writing of the beginning word of registration of the block from the main memory into the buffer memory, the writing data from the execution unit 407 is written into the buffer memory and the main memory.

Figure 5:
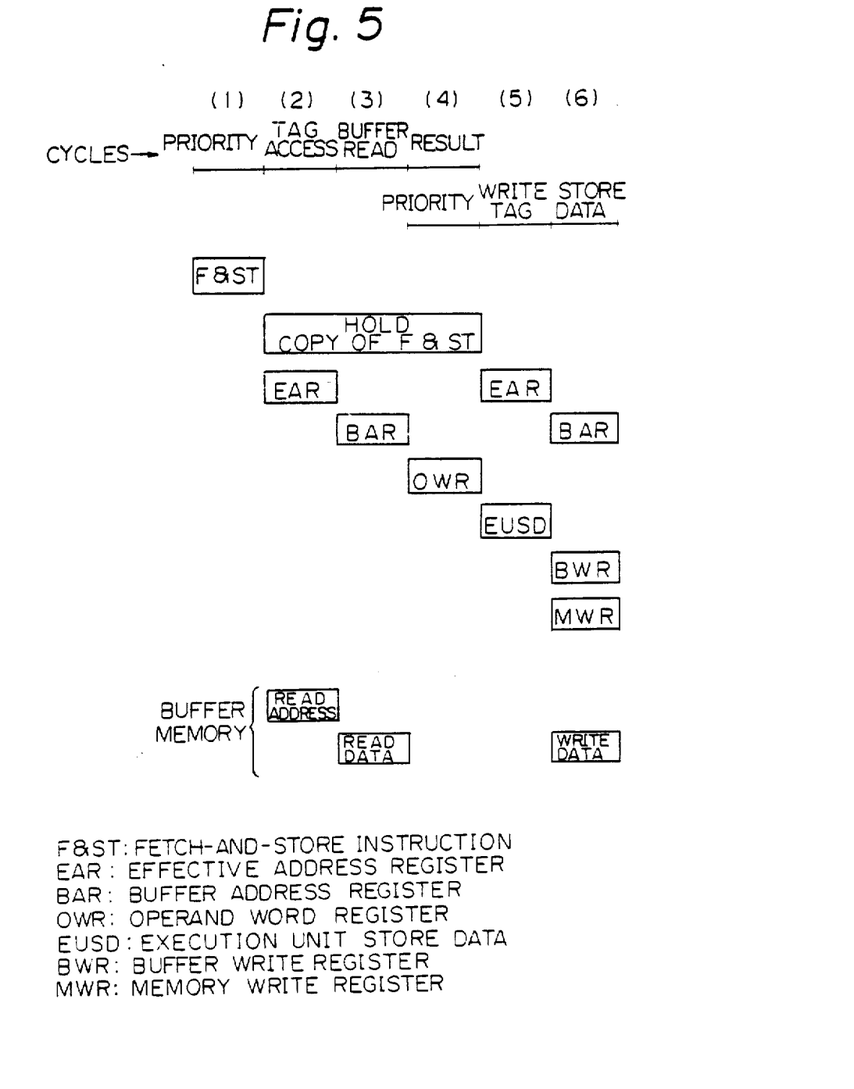
FIGS. 5 and 6 are time charts of the operation of the apparatus shown in FIG. 4.
Figure 6:
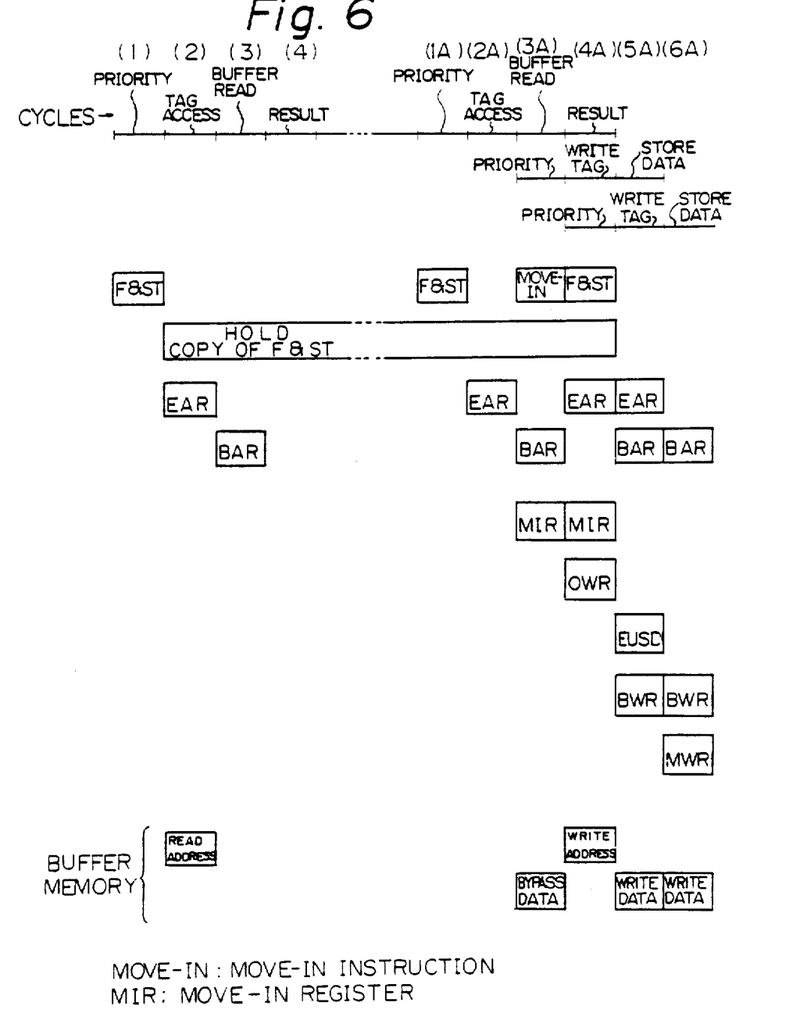

To assist understanding of the operation of the apparatus shown in FIG. 4, time charts of an example of the operation regarding the fetch-and-store instruction are given in FIGS. 5 and 6. The case where the operand of the fetch-and-store exists in the buffer memory is illustrated in FIG. 5, while the case where the operand of the fetch-and-store does not exist in the buffer memory is illustrated in FIG. 6.

The sequence of the cycles for the pipeline timing consists of a priority cycle for the buffer memory access, a tag access cycle for reading the address portion of the buffer memory, a buffer cycle for reading the data portion of the buffer memory, a result cycle of post-processing, a write tag cycle for writing into the address portion of the buffer memory, and a store data cycle for writing into the data portion of the buffer memory.

The process illustrated in FIG. 5 is as follows.
(1) Priority Cycle: Fetch-and-store is instructed.
(2) Tag Access Cycle: Copy of fetch-and-store is held. Effective address register (EAR) 416 is operated. Address portion 2 is read.
(3) Buffer Read Cycle: Copy of fetch-and-store is held. Buffer address register (BAR) 417 is operated. Data portion 1 is read.
(4) Result Cycle: Copy of fetch-and-store is held. Operand word register (OWR) 412 is operated to send data to execution unit 407.
(5) Write Tag Cycle: Execution unit 407 effects logic operation on data from operand word register (OWR) 412. Execution unit store data (EUSD) is sent to buffer write register (BWR) 409 and memory write register (MWR) 413.
(6) Store Data Cycle: Buffer address register (BAR) 417 is operated. Buffer write register (BWR) 409 and memory write register (MWR) 413 are operated to store data into the data portion 1 and main memory MM.

The process illustrated in FIG. 6 is as follows.
(1) Priority Cycle: Fetch-and-store is instructed.
(2) Tag Access Cycle: Copy of fetch-and-store is held. Effective address register (EAR) 416 is operated. Address portion 2 is read.
(3) Buffer Read Cycle: Copy of fetch-and-store is held. Buffer address register (BAR) 417 is operated.
(4) Result Cycle (Priority Cycle): Copy of fetch-and-store is held.

(1A) Priority Cycle: Fetch-and-store is instructed. Copy of fetch-and-store is held.
(2A) Tag Access Cycle: Copy of fetch-and-store is held. Effective address register (EAR) 416 is operated.
(3A) Buffer Read Cycle (Priority Cycle): Move-in is instructed. Copy of fetch-and-store is held. Buffer address register (BAR) 417 is operated. Move-in register (MIR) 408 is operated. By-pass operation regarding data portion 1.
(4A) Result Cycle (Write Tag Cycle, Priority Cycle): Fetch-and-store is instructed. Copy of fetch-and-store is held. Effective address register (EAR) 416 is operated. Operand word register (OWR) 412 is operated. Data is written into address portion 2.
(5A) Store Data Cycle (Write Tag Cycle): Effective address register (EAR) 416 is operated. Buffer address register (BAR) 417 is operated. Execution unit store data (EUSD) is sent to the buffer write register (BWR) 409. Data is written into data portion 1.
(6A) Store Data Cycle: Buffer address register (BAR) 417 is operated. Buffer write register (BWR) 409 is operated. Memory write register (MWR) 413 is operated. Data is written into data portion 1.

Figure 7:
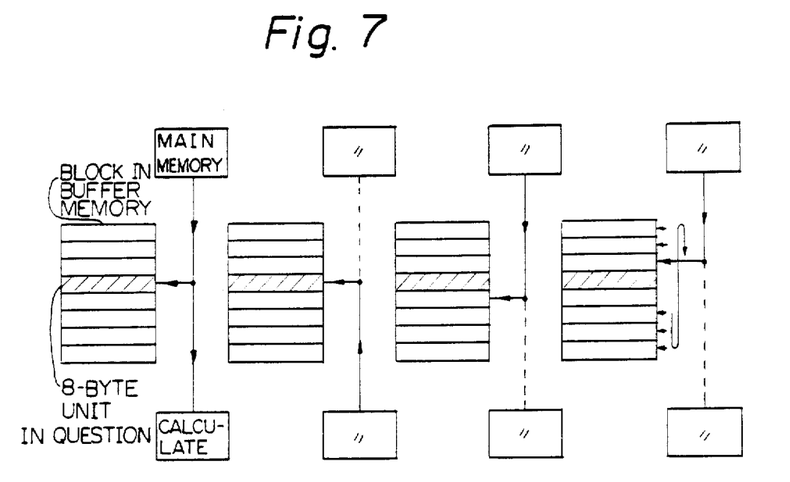
FIGS. 7 and 8 illustrate the manner of a part of the operation of the apparatus shown in FIG. 4.

To assist understanding of the above-described operation of the apparatus, a sequence of illustrative models for the case of the present invention is shown in FIG. 7. The prior art sequence of illustrative models is shown in FIG. 8.

In FIG. 7, the sequence of the operations proceeds from left to right. After writing of the result of the calculation into the 8-byte unit in question in the block in the buffer memory, the transfer of data from the main memory to the remaining 8-byte units in the block in the buffer memory is carried out.

Figure 8:
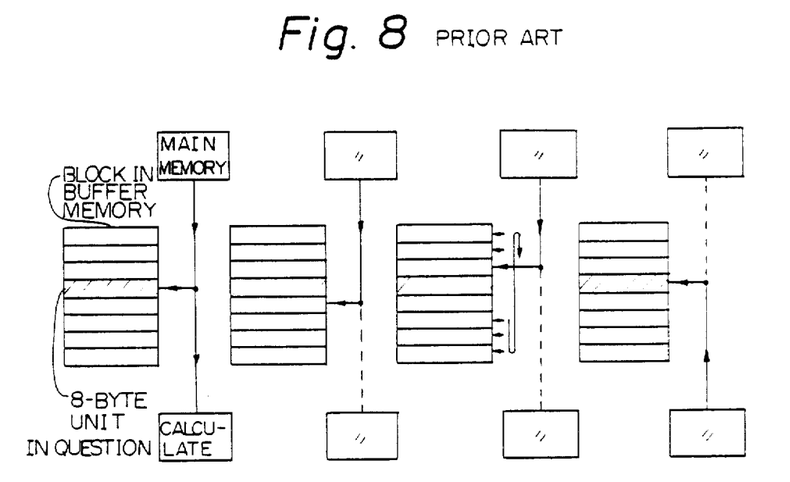

In FIG. 8, the sequence of the operations also proceeds from left to right. Writing of the result of the calculation into the 8-byte unit in question in the block in the buffer memory is carried out only after the transfer of data from the main memory to all the 8-byte units in the block in the buffer memory is completed.

As a modified embodiment of the present invention, a buffer memory control device BMC is added to the apparatus shown in FIG. 4.

Figures 9, 9A:
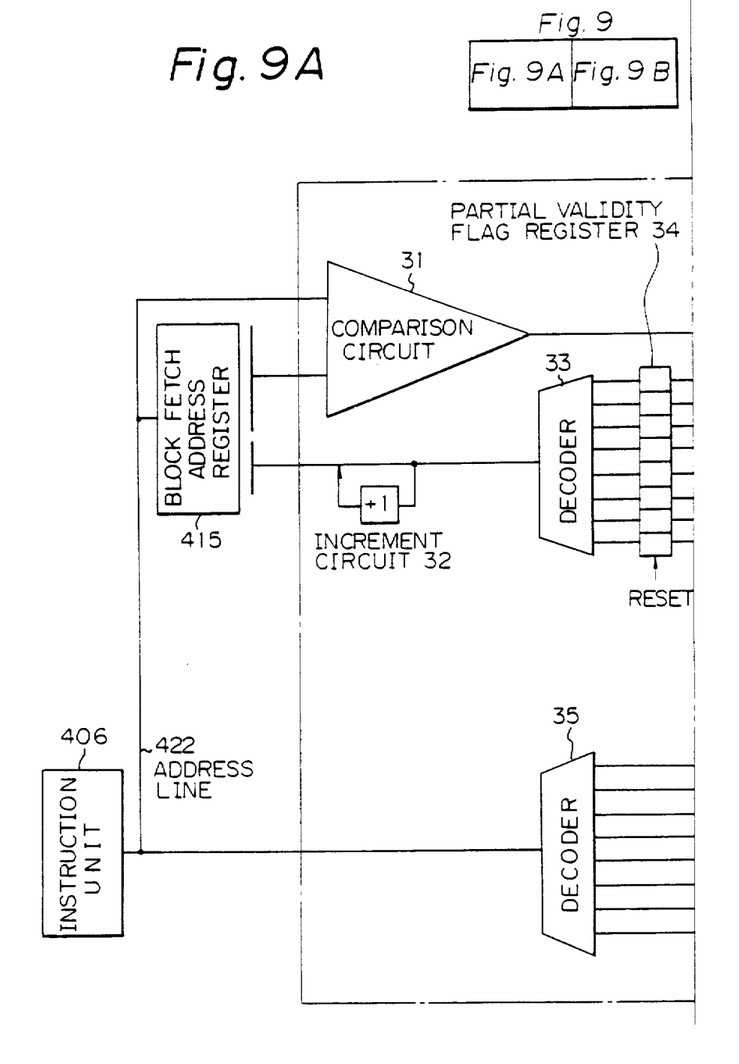
Figure 9B:
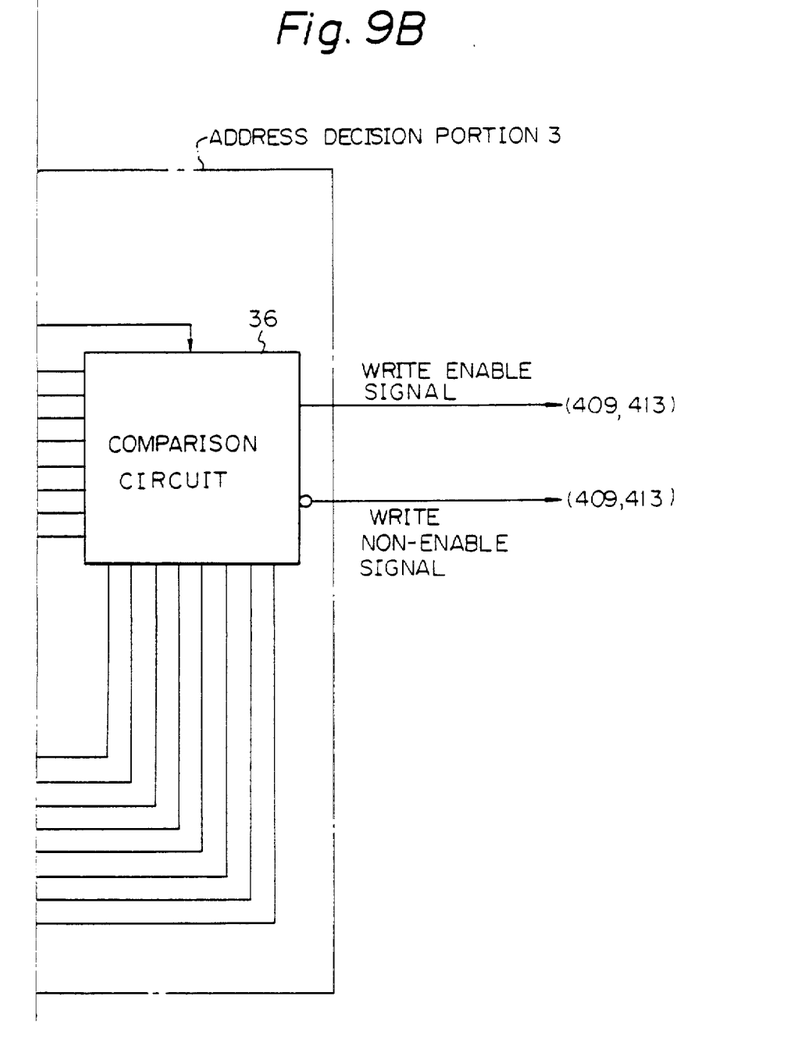

The structure of the buffer memory control device BMC used for the apparatus shown in FIG. 4 is shown in FIG. 9. The buffer memory control device BMC includes an address decision portion 3. The address decision portion 3 includes a comparison circuit 31, an increment circuit 32, a decoder 33, a partial validity flag register 34, a decoder 35, and a comparison circuit 36.

The partial validity flag stored in the partial validity flag register 34 is used for detecting the present registration position in the block BL as shown in FIG. 2. The partial validity flag register 34 consists of 8 bits. The block BL is constituted by eight 8-byte units (8 byte × 8). Each bit of the partial validity flag register 34 corresponds to one of the 8-byte units.

The flag "1" is established in the bit of the partial validity flag register 34 which corresponds to the 8-byte unit to which the move-in operation is carried out. As the move-in operation proceeds for the block BL from the main memory MM to the buffer memory BM, the existence of bit "1" in the partial validity flag register indicates up to which 8-byte unit the move-in operation has been completed.

When all bits of the partial validity flag become "1", that is, when the move-in operation to the block BL is completed, all "1" bits of the partial validity flag are reset. In this case, the validity of the block BL is indicated by the effective bit of each entry of the address portion 2 of the buffer memory BM.

The operation of the address decision portion 3 shown in FIG. 9 will be described. For executing the instruction, the address of the writing of the operand is requested to the buffer memory BM by the instruction unit 406. The comparison between the addresses is carried out by the block fetch address register 415 and the comparison circuit 31. The address of the block which is intended to be transmitted from the main memory MM to the buffer memory and registered in the buffer memory (for example, 26 bits) and the address of the beginning 8-byte unit as the operand (for example, 3 bits) are stored in the block fetch address register 415.

The 3 bits which represent the address of the 8-byte unit in the block fetch address register 415 is incremented by the increment circuit 32 as the registration of the block BL proceeds. The decoder 33 decodes these 3 bits and produces the signal of the set condition for the 8-bit partial validity flag register 34.

Figure 10:
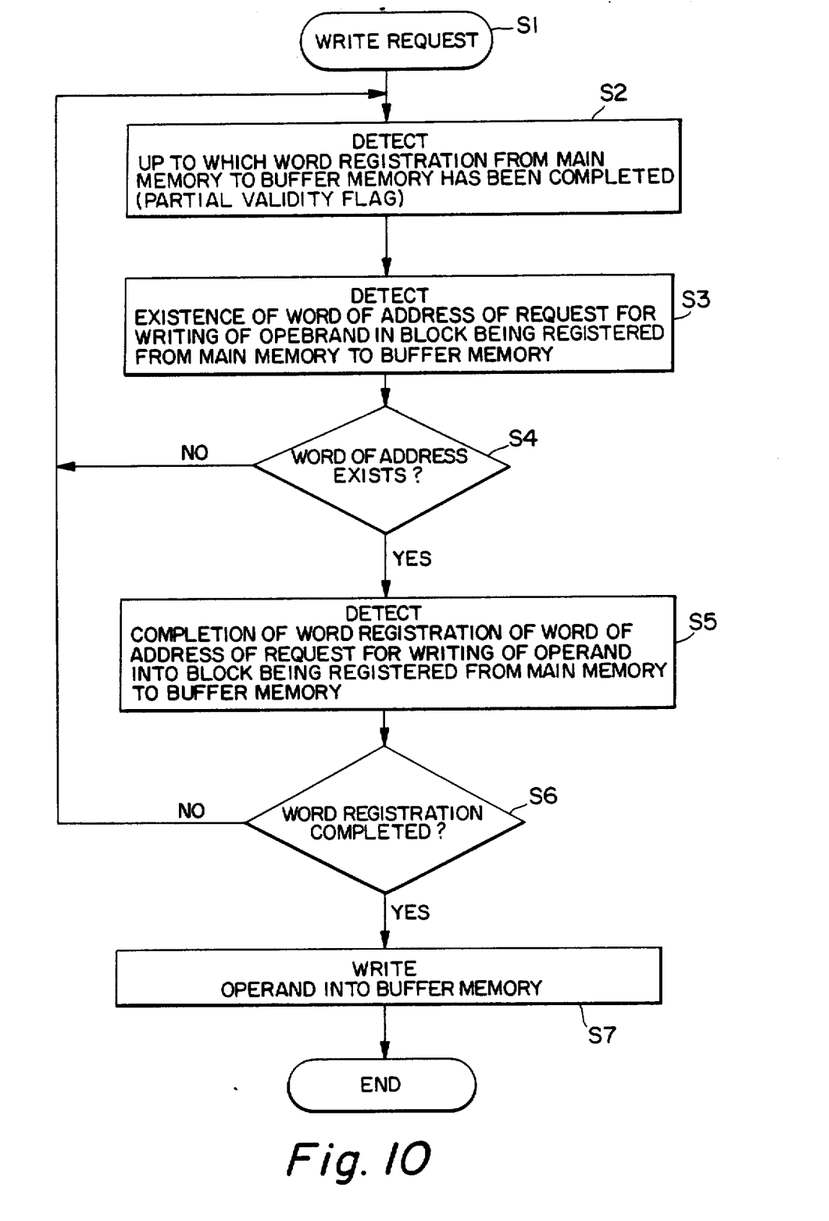
FIG. 10 is a flow chart for describing the method of the present invention.

As illustrated by the flowchart of FIG. 10, when the request for the writing of the operand is issued from the instruction unit 406 to the buffer memory BM (step S1), the 3 bits of two word address of the block BL on the address line 422 are decoded by the decoder 33. The output of the decoder 33 is compared with the partial validity flag of the partial validity flag register 34 in the comparison circuit 36. By this comparison, it is checked whether the partial validity flag corresponding to potential "1" of the signal on the eight output lines of the decoder 33 is potential "1" (step S2).

When it is detected that the word of the address of the request for writing of operand from the instruction unit 406 exists in the block which is being registered in the buffer memory BM (steps S3, S4), and it is detected by the partial validity flag register 34 and the comparison circuit 36 that this word has already been transmitted from the main memory MM to the buffer memory BM and registered in the buffer memory (steps S5, S6), the write enable signal is delivered from the comparison circuit 36, and the delivered write enable signal is transmitted through the buffer write register 409 to the buffer memory BM, through the memory write register 413 to the main memory MM to cause storage in the buffer memory BM (step S7) and the main memory MM.

If the write non-enable signal is delivered from the comparison circuit 36, writing into the buffer memory BM is prevented.

Instead of the above-described store-through type system, it is also possible to apply the present invention to a swap type system in which the updating is only carried out on the buffer memory.

We claim:

1. A method for controlling a buffer memory in a data processing apparatus having a central processing unit which includes the buffer memory, the buffer memory storing a copy of a portion of a main memory, said method comprising the steps of:
    (a) detecting, first, a word unit of a block up to which writing in the buffer memory has been completed during a process of writing a plurality of word units constituting a block from the main memory into the buffer memory, the word units being written in sequence;
    (b) detecting, second, the existence of an address of block containing a write request word from the central processing unit, for writing of an operand in the block which is currently being written into the buffer memory from the main memory; and
    (c) detecting, third, the completion of writing of the word unit in the block which is being written into the buffer memory from the main memory, which corresponds to an address of the write request word from the central processing unit;
    wherein, when a result of said third detecting step indicates that the address of the word unit in the block corresponding to the address of the write request word from the central processing unit has already been written from the main memory into the buffer memory, writing of the operand into the buffer memory is executed even if the writing of the entire block is not completed.

2. A method according to claim 1, wherein said first detecting step is carried out by using a partial validity flag register, and wherein said second and third detecting steps are carried out by using comparison circuits.

3. A method for controlling a buffer memory in a data processing apparatus having a central processing unit which includes the buffer memory, the buffer memory storing a copy of a portion of a main memory, said method comprising the steps of:
    (a) holding an address of a block to be loaded, upon block-loading from the main memory to the buffer memory;
    (b) successively transferring a plurality of words constituting a block, word by word, to the buffer memory and designating a selected flag among partial validity flags arranged in correspondence with the words in the block at each transfer of one word, upon block-loading from the main memory to the buffer memory;
    (c) checking the coincidence between an address of block containing a write request word and the address of the block under load operation held in said holding step (a);

(d) checking whether or not the transfer of the write request word is completed with reference to the flag designated in said transferring and designating step (b), when the result of said coincidence checking step (c) indicates a coincidence; and (e) when the result of said transfer completion checking step (d) indicates a completion, executing a writing into the buffer memory even if the transfer of the entire block which is being transferred is not completed.

* * * * *

UNITED STATES PATENT AND TRADEMARK OFFICE
CERTIFICATE OF CORRECTION

PATENT NO. : 4,924,425
DATED : MAY 8, 1990
INVENTOR(S) : SATORU KOGA ET AL.

It is certified that error appears in the above-identified patent and that said Letters Patent is hereby corrected as shown below:

On the title page, "FOREIGN PATENT DOCUMENTS"
Please insert the following
which was inadvertently omitted
at the Patent Office:

--50-542949 5/1975 Japan--.

Col. 1, line 55, "the" should be --and--.

Col. 5, line 4, "saame" should be --same--.

Signed and Sealed this

Sixteenth Day of July, 1991

Attest:

HARRY F. MANBECK, JR.

*Attesting Officer*   Commissioner of Patents and Trademarks